Figure 4:
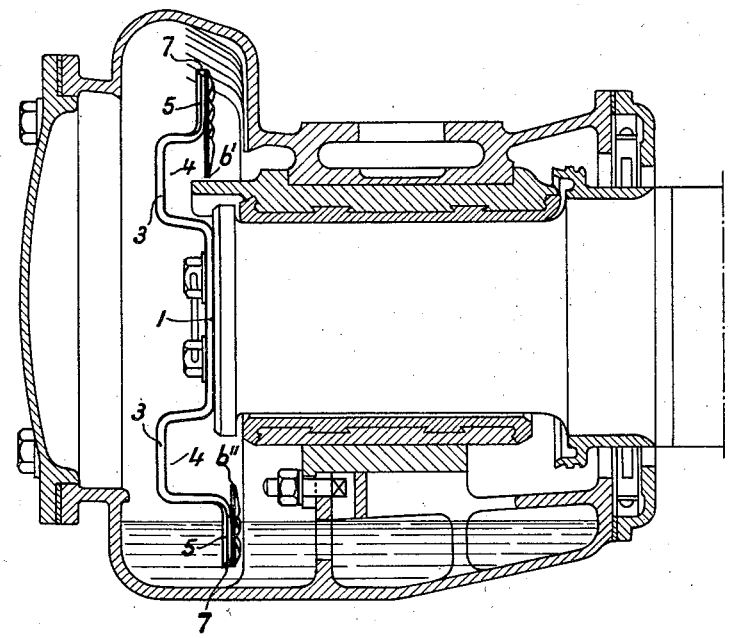

Sept. 10, 1935.　　　　V. A. BARY　　　　2,014,159
LUBRICATION OF AXLE BEARINGS
Filed June 30, 1932　　2 Sheets-Sheet 1
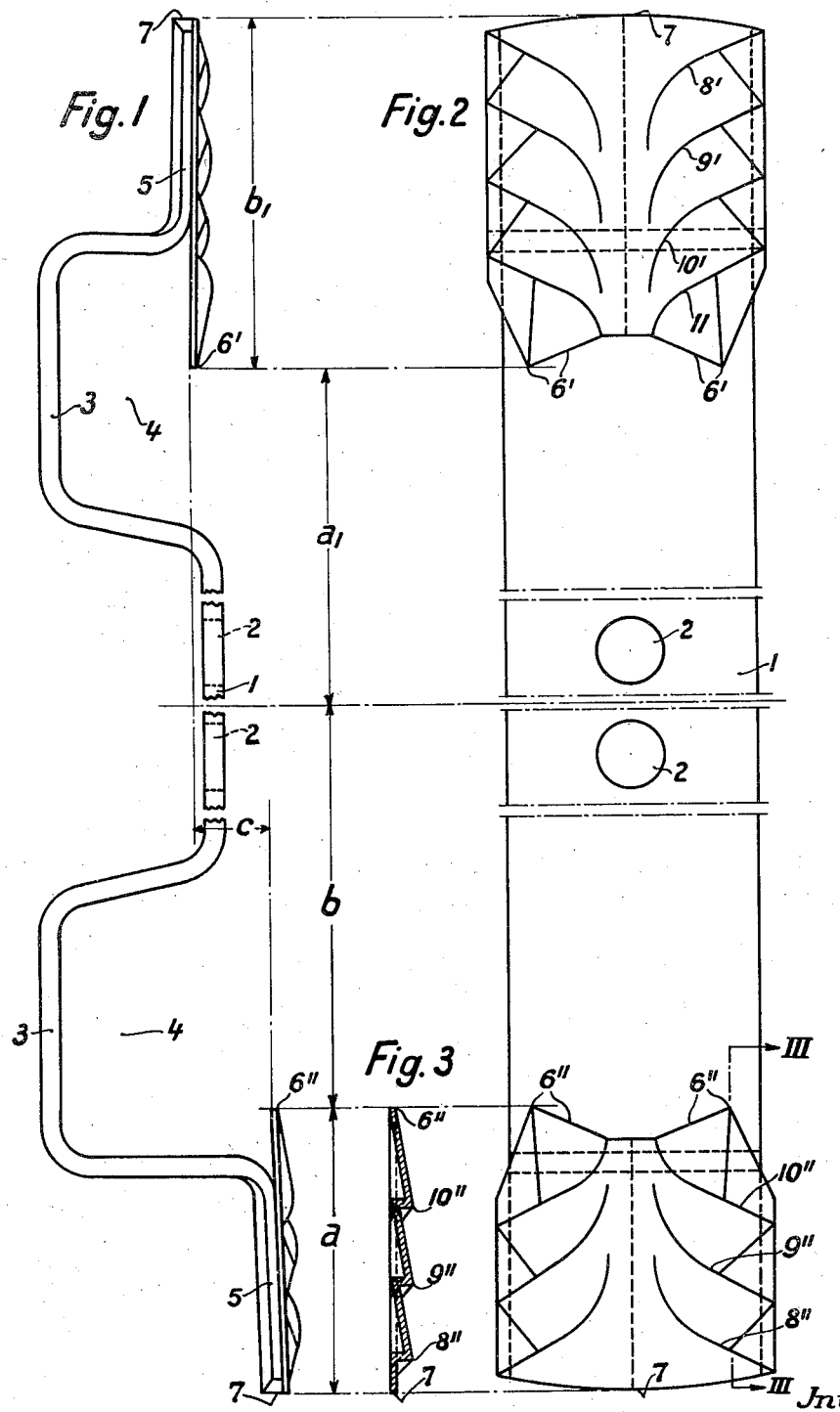

Patented Sept. 10, 1935

2,014,159

UNITED STATES PATENT OFFICE 2,014,159

LUBRICATION OF AXLE BEARINGS

Victor Alexander Bary, Hendon, London, England

Application June 30, 1932, Serial No. 620,145
In Germany July 2, 1931

7 Claims. (Cl. 308—86)

Methods for the supply of lubricant in axle-bearings by dripping, thread formation and centrifugal action are known. The apparatus for carrying out the method consisted of a rotary transfer member, which was driven from the rotating axle-journal; on the rotary transfer member were arranged parts for effecting the dripping, thread formation and centrifugal throwing off of the lubricant. In the case of these transfer members it has already been recognized that at certain speeds of rotation the gravitational force tending to cause the dripping of the lubricant is in equilibrium with the centrifugal force tending to throw off the lubricant, so that the lubricant remains on the blade of the transfer member without reaching the bearing surfaces either directly by dripping or indirectly by being thrown off. This being recognized, the attempt was made to utilize the energy of flow of the current of air resulting from the rotary movement of the transfer member as the force for assisting gravity, so that gravity together with the additional force preponderates over the centrifugal force and thus ensures the dripping process. Several circumstances, however, were not taken into account. In the first place, the fact was not taken into account that gravity and the additional force do indeed transfer into the range of higher speeds of rotation the peripheral speed at which these two forces are in equilibrium with the centrifugal force, as compared with the peripheral speed at which they are in equilibrium when gravity acts alone, but that the occurrence of the state of equilibrium was not avoided; as before, at a certain speed, which is only higher relatively to the previous sped, equilibrium between gravity together with the additional force and centrifugal force occurs and thereby leads to a critical condition in which the bearing surfaces are not lubricated. Regard also was not paid to the fact that a reciprocal action occurred not only between gravity and centrifugal force but also between the forces of gravity and cohesion and between the forces of cohesion and centrifugal force. Thus between the periods when the dripping process and the process of throwing off the lubricant by centrifugal force occurs there is a period when the lubricant is supplied by being converted into a thread-like state, when the speed of the transfer member is greater than the dripping speed and not yet so great that the centrifugal force exceeds the force of cohesion. During the transition from one to another of these periods conditions of equilibrium occur, which, if the rail vehicle remains for a long time at this critical speed, also leads to the bearings of the vehicle becoming dry. The object of the present invention is to carry out the method of supplying lubricant and to construct the apparatus therefore in such a manner that the supply of lubricant is ensured even during the critical conditions.

The method of solving the problem which is proposed, in accordance with the present invention, is characterized by the fact that the forces of gravity, cohesion and centrifugal force are brought into action on the lubricant in such a manner that there are at least two different mutual or reciprocal actions. The method has the advantage that, if one of the mutual actions falls within the critical range, the other mutual action falls with certainty outside this range, so that the supply of lubricant is ensured. The apparatus proposed for carrying out the new method, according to a further development of the idea underlying the invention are of the greatest simplicity as compared with the known apparatus which effect only a partial solution. They are characterized by the displacement of the parts which effect the dripping, thread formations and throwing off of the lubricant in the radial or in the axial direction, or in both directions, so that at least two different processes of dripping, thread formation and throwing off of the lubricant are free to take place. The displacement is so arranged that the different mutual actions, which are complete in themselves, lie, as regards their critical range, with certainty beside one another.

It is a feature of the invention that all the mutual actions need not differ among themselves. If one is satisfied with a less perfect action, some of the mutual actions may be complete in themselves and similar, if the resultant danger be taken into account. What has been stated regarding the process holds good of course for the apparatus. Some of the displacements may be omitted without affecting the essence of the invention.

A constructional embodiment of the invention is illustrated, by way of example, in the accompanying drawings, in which Fig. 1 is a side elevation of a transfer member constructed in accordance with the invention, Fig. 2 is an elevation of the same, looking in the direction of the axis of the axle-journal, and Fig. 3 is a vertical section through the transfer member taken on the line III—III of Fig. 2, Fig. 4 shows in vertical longitudinal section through an axle-bearing the arrangement of the blade according to Figs. 1–3.

Referring to the drawings, 1 indicates the middle part of the transfer member which is provided with holes 2 for the reception of screws or like means for fastening it to the journal. The transfer member is thus rotated by the journal which is not illustrated. Beyond the middle part 1 the transfer bar has two symmetrical bends 3, forming spaces 4, into which the blades fixed to the ends 5 of the transfer bar project and form drip points, drip edges, drip surfaces or drip bodies.

Now, in accordance with the invention, the transfer blades have the following peculiarities.

In the first place the parts 6' and 6 of the transfer member intended for drip formation are relatively displaced, in that the edges 6' of the upper blade have a radial distance $a_1$ from the centre of the journal which is different from that of the edges 6''; the distance $b$ of the latter from the centre of the journal, measured in the axial direction, is greater than $a_1$. By this means a differentiation between the forces of gravity and cohesion is effected. Thus at the same peripheral speed of the journal the edge 6' of the transfer member has a peripheral speed which is different from that of the edge 6'' of the transfer member. If it be assumed that the limiting speed has just been reached at which the forces of gravity and cohesion are in equilibrium on the edge 6'', so that lubricant no longer drops from the edge 6'' and on the other hand the thread of lubricant formed is not yet so pronounced that it is deposited in appreciable amount on a fixed part which projects into the space 4 and is provided on the bearing surface for the further transference of the lubricant, then in this condition the edge 6' has a peripheral speed which is considerably less than that of the edge 6''. This edge 6' has a speed which is less than the critical speed at which the forces of gravity and cohesion are in equilibrium, so that the part 6, even during this condition, maintains the supply of lubricant to the bearing surfaces by dripping lubricant on to the fixed part provided for its further transference which projects into the space 4. If the velocity increases and the part 6' assumes the said critical speed, then the part 6'' is already in the range of speed in which a strong thread of lubricant is drawn from the lubricant well, which thread is deposited on the fixed part which is arranged for its reception, so that the supply of lubricant necessary for lubricating the bearing surfaces is maintained. In order that the depth to which both blades dip into the lubricant well may be the same, the outer edges 7 of the blades are preferably at the same radial distance $b_1+a_1$ and $a+b$ respectively from the centre of the journal. Since $a_1$ is smaller than $b$, the length of $b_1$ of the upper blade, measured in the radial direction, is greater than the length $a$ of the lower blade. Owing to this, different actions occur during the drip process itself. Assuming for example that an element of lubricant has collected on the part 7 of each blade on dipping into the lubricant well, this element must travel a greater distance before reaching the drip edge 6' than the element on the other blade travels to reach the drip edge 6''. Therefore the latter element drops earlier from the drip edge 6'' than the other element from the drip edge 6', if the difference in time between the dipping of the two blades into the lubricant well is not taken into account. This difference in time works out as a difference in space, measured relatively to the circle described by the conveyor blades, in that the element which drops from the edge 6'' drops on to a part of the fixed part provided for its reception which is different from the part on to which the element from the edge 6' drops. Since the receiving part is usually formed by a forwardly projecting portion of the axle brass which runs concentrically to the axis of the journal, the two drip points therefore lie at different places on the curved receiving part which is thus uniformly made use of over its width.

If the conveyor blades were arranged in the same plane, the threads of lubricant drawn up by the two blades would cross and be deflected, so that only a part of the thread of lubricant would reach the projecting part on the axle-brass intended for its reception. By relatively displacing the two blades by the distance $c$ in the axial direction, the result is obtained, according to a further development of the invention, that the two threads remain entirely independent the one of the other and do not interfere with one another, so that even during the period of thread formation different actions occur.

Not only the edges 6' and 6'' but also the surfaces of the blade itself are subdivided for the differentiation of the forces of cohesion and centrifugal force or gravity and centrifugal force and the resulting parts are relatively displaced in the radial direction. Fig. 3 shows, in the profile of the blade, edges 8'', 9'', 10'' which are coordinated to the corresponding edges 8', 9', 10' and 11' on the other blade. If, for example, the forces of cohesion and gravity are in equilibrium at the peripheral speed of the edge 6'', then the edge 10'' is perhaps still within this range, so that from this edge also lubricant is not yet thrown off. The edge 6' certainly still lies within the range of pure cohesive forces, so that threads of lubricant are thereby formed and deposited thickly on the part of the axle brass intended for their reception. The edges 9'', 8'' and 7 as well as 9', 8' and 7, however, already lie in the range of pure centrifugal force, so that at these places the lubricant is already thrown off and is then conducted indirectly to the axle-brass by flowing back in the blade casing and dripping on to the axle-brass. Finally at increased peripheral speeds the edges 10'' and 10', and afterwards 6'' and 11' and lastly the edge 6' operate within the range of pure centrifugal action, and then the whole of the lubricant which is supplied is thrown off by centrifugal force and conducted indirectly in the manner described to the bearing surfaces. Thus in the arrangement illustrated at least two different mutual actions in regard to the actions of gravity, cohesion and centrifugal force, always take place, so that the supply of lubricant is ensured at all peripheral speeds of the journal. The alteration in the mutual actions leads positively to an alteration of the effects within the individual processes of dripping, thread formation and thrown-off by centrifugal force, so that a further advantageous effect on the supply of lubricant is also produced thereby.

It is of course within the invention, to dispense with the differences in some of the mutual actions, or on the corresponding displacements. Thus for example the displacement of the blade surfaces by the distance $c$ in the axial direction can be omitted, if the action of independent and therefore of mutually non-interfering threads of lubricant be dispensed with. What has been said with regard to the displacement $c$ holds good also for the displacement $b$ or $a_1$; or $a$ or $b_1$; or $8'$, $9'$, $10'$, $11'$, $6'$, or $8''$, $9''$, $10''$ and $6''$ or any desired variations of these. The invention is not changed by these alterations but only the completeness of the actions produced.

I claim:—

1. A rotary conveyor member in axle bearings for rail vehicles for conveying lubricant by dripping, thread formation and throwing off by centrifugal force at all speeds of rotation of the axle journal comprising in combination an axle journal, carriers secured on the axle journal, conveyor blades supported by the carriers and rotating therewith, elevations on the said conveyor blade, said elevations designed like double-ridged roofs in a radial direction, the steep surface of each roof surface being situated at a greater distance from the axis of rotation of the carrier than the slightly inclined surface and the ridge edges of the said roof surfaces adapted to easily remove the lubricant.

2. A rotary conveyor member according to claim 1, in which the slightly inclined roof surfaces rise from the side edges of each conveyor blade to the middle and merge there into a flat strip located in the plane of rotation.

3. A rotary conveyor member according to claim 1, in which the ridge edges at the sides of each conveyor blade, which form the points where the lubricant is removed, are situated at a greater distance from the axis of rotation of the carrier than from the middle of the conveyor rod.

4. A rotary conveyor member according to claim 1, in which the removal points on one conveyor blade show different distances from the axis of rotation of the carrier than removal points on the other conveyor blade.

5. A rotary conveyor member according to claim 1, in which the said conveyor blades are situated with their inner tips at different distances from the axis of rotation of the carrier while the outermost edges of the conveyor blades are at equal distances from the same axis of rotation.

6. A rotary conveyor member in axle bearings for rail vehicles for conveying lubricant by dripping, thread formation and throwing off by centrifugal force at all speeds of rotation of the axle journal comprising in combination a driving shaft, carriers secured to the driving shaft, conveyor blades supported by the carriers and rotatable therewith, and elevations and depressions arranged on the conveyor blades to vary the forces on the latter which forces enforce dripping, thread formation and centrifugal action, and the edges of certain of the depressions and elevations on the different conveyor blades being situated at a different distance from the axis of rotation.

7. A rotary conveyor member in axle bearings for rail vehicles for conveying lubricant by dripping, thread formation and throwing off by centrifugal force at all speeds of rotation of the axle journal comprising in combination a driving shaft, carriers secured to the driving shaft, conveyor blades supported by the carriers and rotatable therein and situated in different planes perpendicular to the axis of rotation, and elevations and depressions arranged on the different conveyor blades to vary the forces on the latter which forces enforce the dripping, thread formation and centrifugal action.

VICTOR ALEXANDER BARY.